United States Patent [19]

Khayat et al.

[11] 3,928,637

[45] *Dec. 23, 1975

[54] METHOD OF TREATMENT OF ANIMAL FLESH

[75] Inventors: Ali Khayat, Huntington Beach; George W. Courtney, San Pedro; Howard J. Dunn, Lomita, all of Calif.

[73] Assignee: Ralston Purina Company, St. Louis, Mo.

[ * ] Notice: The portion of the term of this patent subsequent to Nov. 26, 1991, has been disclaimed.

[22] Filed: July 19, 1974

[21] Appl. No.: 479,323

Related U.S. Application Data

[62] Division of Ser. No. 328,797, Feb. 1, 1973, Pat. No. 3,851,078.

[52] U.S. Cl. ............................. 426/437; 426/281
[51] Int. Cl.² ........................................ A23L 1/325
[58] Field of Search ........... 426/149, 271, 286, 437, 426/269, 442, 376, 281

[56] References Cited
UNITED STATES PATENTS
3,552,978  1/1971  Inklaar .............................. 426/281

*Primary Examiner*—A. Louis Monacell
*Assistant Examiner*—R. A. Yoncoskie
*Attorney, Agent, or Firm*—Veo Peoples, Jr.

[57] ABSTRACT

A method of controlling the color of animal flesh and particularly, the color of tuna type fish is disclosed. By applying cysteine or homo-cysteine to the flesh of tuna-type fish an improvement of the color, especially a lightening of the color, and in some cases the greening thereof is reduced or prevented when the fish is cooked. Additionally, the addition of cysteine or homo-cysteine has beneficial results in the removal of mercury from the tuna flesh.

7 Claims, No Drawings

METHOD OF TREATMENT OF ANIMAL FLESH

This application is a divisional of copending parent application, Ser. No. 328,797, filed Feb. 1, 1973 and now U.S. Pat. No. 3,851,078.

BACKGROUND OF THE INVENTION

In the processing of tuna type fish which includes yellowfin, skip jack, albacore, blue fin, big eye, etc. there is a phenomena generally recognized in the tuna processing art as greening of the fish. This greening of the fish flesh occurs during the initial cooling of the fish, such as the precooking of the fish prior to the canning thereof. Upon the precooking of such fish a very visible green discoloration occurs rendering the fish unfit for consumer acceptance and commercial packing. The precise reason why this greening occurs is not known and so far as is known by us it has been impossible according to prior known methods of determining which fish in a particular batch would be subject to the greening effect. Thus, considerable amounts of effort and operating space might be consumed in the processing of the fish with a subsequent result that the greening occurs requiring the destruction of such fish. Further, the use of muscle tissue with the higher heme content proteins from many species of such fish has been restricted because of their darker color.

Applicants' present method enables the tuna processor to treat the tuna-like fish prior to the precooking, i.e. while the fish is in a raw condition, such that discoloration or darkening of the fish upon cooking and in some instances the greening of the fish does not occur. Such treatment may consist of treating the whole fish by injection or may be performed by forming a slurry of the fish flesh and treating the slurried material. Applicants have found that by treating the animal flesh such as fish flesh with a material and particularly, cysteine or homo-cysteine that a lighter colored cooked flesh is obtained. Moreover, treatment of fish flesh with homo-cysteine prevented the greening of the fish during pre-cooking. Additionally it has been found that by treating fish flesh with cysteine or homo-cysteine a reduction in the mercury content of such tuna flesh may also be obtained.

It is therefore a principle object of the present invention to provide a method of treating tuna flesh such that an improvement of the color, i.e., a lighter colored cooked product and elimination of greening of the flesh is obtained during the precooking thereof.

Also, the present invention relates to a method of removing or reducing the mercury content of tuna. Several experiments have been tried to extract the methyl mercury from the muscle protein of tuna by boiling the tuna in water and giving the fish a longer precooking time in an effort to leach out the methylmercury into the water fraction or to volatilize it in the steam distillate from the cookers. These experiments and others demonstrated that the methyl-mercury was strongly bonded to the muscle protein and could not be volatilized or extracted away by ordinary cooking methods. Applicants have found that by treating tuna flesh with cysteine, homo-cysteine or other mercaptans it is possible to remove mercury from the fish flesh. The preferred method of treating the tuna flesh being to contact the flesh with a mercaptan at a pH of 4–5 followed by heating to effect the partial removal of the mercury from the tuna flesh.

Briefly, the present invention is concerned with applying a predetermined amount of cysteine or homo-cysteine to the flesh of tuna in order to obtain tuna which has a lighter colored cooked meat and which is not discolored by greening during the precooking thereof, and also, which permits the handling of the fish flesh to effect a reduction of the mercury content of such tuna. This application of the cysteine or homo-cysteine may be achieved by injecting whole fish with the material prior to the precooking thereof or may be achieved by blending the cysteine or homo-cysteine with a slurry of the tuna flesh. The present disclosure is directed to the treatment of tuna type fish, since this is the best mode of practicing the present invention, however, as will be obvious other types of animal flesh may also be treated in accordance with the present invention.

These and other objects and advantages of the present invention will become more apparent from the description hereinafter.

PREFERRED EMBODIMENTS OF THE INVENTION

Whole fish selected from the tuna family such as albacore, skip jack, yellowtail, bluefin and big eye, hereinafter all to be referred to as tuna, are obtained in the normal manner and subjected to a standard eviscerating operation. The whole fish while still in an uncooked or raw state is then passed to a position wherein injection needles may be forced into the tuna fish in order to inject a predetermined amount of a reagent selected from the group of cysteine or homo-cysteine into the tuna flesh. The precise configurations of the injection needles and the location of the injections into the tuna fish are not critical. However, it should be understood that it is necessary that the injection of the cysteine, or homo-cysteine be performed at an effective level and in such a manner that during the precooking of the tuna flesh good distribution of the material is achieved throughout the tuna fish such that the greening or discoloration does not occur. It has been found that injections of quantities of cysteine, or homo-cysteine of less than about 0.3 percent by weight of the tuna fish are effective in improving the color and in the case of homo-cysteine or reducing or eliminating the greening or discoloration of the fish. Levels in excess of 0.3 percent may be utilized, however, change in the color, if amounts in excess of about 0.3 percent are used, do not appear to render any improved results. The preferred range of cysteine, or homo-cysteine for injection is between about 0.2 – 0.3 percent by weight of the tuna. Following the injection of the tuna fish with the cysteine, or homo-cysteine at the levels described, the tuna fish is then subjected to the standard precooking operation. The effect of the addition of the cysteine or homo-cysteine does not alter or physically change the composition of the tuna meat and in all other aspects the so treated tuna flesh appears to behave as does the standard non-treated tuna fish. The effect which is derived from the injection of the cysteine or homo-cysteine is the beneficial effect that an improvement in the color is observed, i.e. the cooked flesh is a lighter color and the greening of the tuna during precooking does not occur.

As an alternative to treating the whole fish with cysteine, or homo-cysteine, it is also possible to treat the tuna flesh by means of forming a slurry of the tuna fish to be subsequently treated. The slurry of the tuna flesh may be useful in forming other products or restructured products from such a slurry. Such products and the process of producing them from a slurry of tuna is disclosed and described in assignee's copending application Ser. No. 124,953 filed Mar. 16, 1971.

In the alternative treatment of tuna flesh in the form of a slurry, it is preferable in the formation of the slurry that the tuna fish after the standard evisceration procedure be subjected to a deboning operation. The deboning operation is not critical but is merely utilized to remove the bones and skin from the flesh of the tuna. Such deboning apparatus is commercially available and is well known in the art. The texture of the meat as it exits from the deboning apparatus is not critical, and it is desirable that the temperature of the fish is not substantially increased. Following the deboning operation the tuna meat is then subjected to a grinding operation which is sufficient to place the flesh into a condition suitable for forming a slurry. The slurry may be of any desired solids content such that it is suitable for handling. A suitable solids content would be approximately 20 percent, however, other solids content may be utilized depending upon the operator's preference. If desired, following the formation of this slurry an antioxident may be added to the slurry at a rate of about 0.02 percent of the fat content of the slurry. This is merely to prevent oxidation of the fat during the subsequent processing thereof.

After the formation of the slurry, and if necessary, the slurry is then subjected to a homogenizing step which is sufficient to reduce the particle sizes such that the maximum size of the slurry is about 1/16 inch. This is determined by passing the slurry through a filter or mesh screen having 1/16 inch openings therein. As is obvious, if the grinding of the tuna is to a sufficient degree so that desired particle size of the slurry is obtained, the homogenization step is not necessary. Preferably, the homogenizing step will be included. During the homogenizing step the slurry should be kept sufficiently cooled to prevent bacteria growth or enzyme activity. It has been found that when using an ultrasonic homogenizer at 90–100 watts that a minimum of about 6 minutes is needed to obtain the desired particle size. The homogenization should be performed under conditions such that coagulation of the protein does not occur. If desired, other homogenizing apparatus and time may be utilized to obtain the desired size of the material.

Following the homogenizing of the slurry, cysteine, or homo-cysteine may be added to the slurry at a concentration up to about 0.3 percent by weight of the tuna fish. Greater quantities of reagent may be used, but have little significance in further improving the color of fish. The cysteine, or homo-cysteine in the slurry has the effect of improving the color of the fish when it is cooked, i.e., the cooked flesh is lighter in color. In addition, homo-cysteine has the effect of reducing or preventing the greening or discoloration of the tuna upon cooking. As previously discussed, higher levels of cysteine, or homo-cysteine may be utilized to improve the color of the cooked flesh, however such higher levels do not appear necessary to obtain the desired result.

If desired, the slurry following homogenization and prior to the addition of the cysteine or homo-cysteine may be subjected to a centrifuging operation in order to separate the soluble and insoluble portions of the slurry. The insoluble portion of the slurry would essentially consist of the myoglobin parts and the nonheme proteins. The soluble or hemoglobin portion of the slurry would then be treated by adding the cysteine, or homo-cysteine at the desired level. As previously discussed, the addition of the cysteine, or homo-cysteine would as a practical matter be at a level up to about 0.3 percent by weight of the whole fish. Additionally, it is desirable although not necessary to adjust the pH of the soluble fraction to the range of about 7.8 to 8.3 and preferably about 8. This pH adjustment may be carried out with any food grade alkaline material. The soluble fraction portion is then subjected to a heating sufficient to coagulate the protein therein. The heating would be in the range of 72° C. to 77° C. above about 77° C. an off color or grayish condition appears in the tuna flesh. Following the heating to coagulate the protein, the slurry is then subjected to a centrifuge or filtering step to recover the coagulated protein. Approximately, 70 percent of the protein is recovered, but this will depend upon the operator's methods of recovering the protein and also in the type of heating to which the protein material has been subjected.

The recovered coagulated protein is then placed into another slurry which may then be homogenized in a manner such that all of the material will pass through a filter having 1/16 inch holes therein. The water content added to the coagulated protein in order to form this slurry will be sufficient to get the desired final moisture of the end product. The insoluble protein fraction which was previously separated is then blended or mixed back with the homogenized coagulated protein in obtaining the final product. The final product should have a moisture content in the range of about 60–65 percent to be in a condition suitable for use in forming restructure protein products. However, a final product having other moisture contents may be obtained depending on the operator's preference. The final product upon cooking exhibits good color characteristics and does not green or discolor with the cooked final product exhibiting a lighter color than cooked tuna flesh which has not been treated with cysteine or homo-cysteine. If further color improvement is desired, it may be desirable to add 0.1–0.2 percent by weight of cysteine or homo-cysteine to the final product mixture because of the insoluble protein added to the mixture and the possibility that some of the cysteine was discarded in the liquid during the centrifuging following the heat treatment of the soluble portion.

Additionally, it has been found that when the coagulated protein is separated during the centrifuging or filtering step, that a reduction in the mercury content of the tuna fish mixture is obtained. The precise reason for this reduction of the mercury content of the tuna is not known but it is theorized that the cysteine or homo-cysteine is effective to render the mercury to the form of a water soluble complex so that it may be released from the tuna flesh. This will be discussed in greater detail hereinafter.

The following examples are illustrative of the invention and are not intended to limit the scope thereof.

EXAMPLE 1

Albacore which had previously been eviscerated and debonded was ground to obtain 350 grams of whole fish (approximately 68 grams of protein). Three volumes of water were added to the ground fish to form a slurry. BHA was added to the slurry at a level of 0.02 percent of the fat content. The slurry was homogenized at 1°C. for 6 minutes by an ultrasonic device at 90–100 watts and passed through a screen having 1/16 inch openings therein. The slurry was then centrifuged at 8700 g for 10 minutes to separate the insoluble protein fraction from the soluble protein fraction. Approximately 49 grams of protein were obtained in the insoluble fraction and approximately 23 grams of protein in the soluble fraction. 0.3 percent cysteine by weight of the tuna was added to the soluble fraction and the pH adjusted to 8.3 with food grade alkaline material. The soluble fraction slurry was then heated to 76° C. for 5 minutes while continuously stirring. The coagulated proteins (approximately 16 grams) were separated by filtration and formed into a second slurry. The insoluble protein fraction was then blended with the second slurry to obtain the final tuna product. The final tuna product was blended with soy curd as discussed in assignee's co-pending application Ser. No. 124,953 filed Mar. 16, 1971 with the final product exhibiting improved or lighter color properties than products prepared with tuna flesh which had not been treated with cysteine.

EXAMPLE 2

The method of Example 1 was followed using different levels of cysteine and following retorting of the final product for 80 minutes at 242° F. Tristimulus Color Values were recorded showing the improvement or lightness in color as follows:

| Sample | % Cysteine | Tristimulus Color Values | | |
|---|---|---|---|---|
| | | Blue | Red | Green |
| Control | x | 25 | 38 | 34 |
| 1 | .04 | 31 | 44 | 45 |
| 2 | .1 | 31 | 45.5 | 44.5 |
| 3 | .2 | 32 | 47.5 | 45.5 |
| 4 | .4 | 33.5 | 48 | 45.5 |
| 5 | .6 | 34 | 48 | 46 |

Since all the tristimulus reflectance values are increased when cysteine is added to the tuna flesh over the control it is clear that the cysteine treated product has lighter color following cooking.

EXAMPLE 3

The method of Example 2 was followed with a comparison being made as to the effect of comparable amounts of cysteine and homo-cysteine being added to the tuna flesh.

| Sample | Tristimulus Color Values | | |
|---|---|---|---|
| | Green | Red | Blue |
| Control — no treatment | 47.7 | 52.7 | 32 |
| Tuna flesh treated with .025% cysteine | 52.5 | 55.9 | 35.9 |
| Tuna flesh treated with .025% homo-cysteine | 55 | 58.9 | 39.4 |

EXAMPLE 4

The method of Example 1 was followed using the dark meat of chicken. The tristimulus reflectance values for cooked chicken treated with cysteine and not treated with cysteine were as follows:

| Sample | Tristimulus Color Values | | |
|---|---|---|---|
| | Green | Red | Blue |
| Untreated | 32 | 41.4 | 21.8 |
| Treated with .3% cysteine | 51.6 | 54 | 40.6 |

As previously discussed, as a further alternative to the present invention, the fish flesh may be formed into a slurry and treated with material having a sulfhydilryl free group yielding a sulfhydryl bond and more particularly a reagent from the group of cysteine, homo-cysteine, thiosulfate or other mercaptan. It was previously found that the mercury was not removed from raw fish by soaking in chelating agents, however, the treatment of tuna flesh as hereinafter disclosed has proven effective in reducing the mercury content of tuna. It is desirable in effecting the removal of mercury from the flesh of tuna to form a slurry having a water to fish ratio of 1:1. Other ratios of water to fish may be utilized, however, for efficient operation the 1:1 ratio is preferred. Following the formation of the slurry a reagent selected from the group of cysteine, homo-cysteine, thiosulfate or other mercaptan may be added to the slurry. When using cysteine or homo-cysteine as the additive it is not necessary to adjust the pH of the slurry although it may be desired. When using other mercaptans, or thiosulfate it is desirable to adjust the pH to 4–6 to obtain most effective mercury removal. The desired acid for this pH adjustment is citric acid, however, others such as sulphuric, hydrochloric and phosphoric acid may be utilized. The reagent may be added at any desired level to obtain the mercury removal however, when small quantities of reagents are utilized, the mercury removal is still achieved, but not a large amount. An effective level of reagent would be up to about 5 percent by weight of fish. Levels of reagent above about 5 percent may be utilized to effect the mercury removal, however, there does not appear to be any further significant reduction in mercury in the fish when these higher levels are used.

The slurry should then be agitated or allowed to stand for a sufficient period of time to allow the reagent to be substantially diffused through out the fish in the slurry. The fish slurry is then subjected to a heat at a temperature and for a time to coagulate the protein. Preferably the heating is to a temperature of 212° F and for a period of between 5 minutes and 180 minutes. The excess reagents and mercury are then removed from the fish either by pressing, centrifuging or by water rinsing or by a combination thereof. The so streated material exhibits a reduced content of mercury. If desired, the tuna flesh may be cooked prior to the treatment to remove the mercury. It is thus only necessary to form the cooked meat into a slurry, apply the predetermined quantity of cysteine, homo-cysteine, thiosulfate or other mercaptan to the slurry, allow the slurry to stand for a period sufficient for the mercury to be extracted, usually at least 1 hour and thereafter the tuna flesh may be separated from the filtrate containing the removed mercury to obtain the final tuna flesh product having reduced mercury content. The final product may then be shaped and packed in cans or may be restructured in accordance with assignor's copending application Ser. No. 124,953 filed Mar. 16, 1971.

The following examples are illustrative of the invention and are not intended to limit the scope thereof.

EXAMPLE 5

100 g of a slurry of tuna flesh and water at a 1:1 fishwater ratio and a solids content of about 14 percent was placed into a beaker. The tuna had an initial mercury content of 1.04 ppm on a dry weight basis. Citric acid was added to the slurry to adjust the pH to 4.65 and 1 percent sodium thiosulfate by weight of the fish was added to the slurry. The slurry was allowed to stand for about 1 hour to allow complete diffusion of the reagents throughout the fish. The fish was then heated to 212° F. for 60 minutes. The tuna flesh was then separated from the aqueous solution. The mercury content of the tuna flesh was 0.65 ppm on a dry weight basis.

EXAMPLE 6

The procedure of Example 4 was followed with the additional step of a second extraction or separation step of the slurry using distilled water. The separated tuna flesh was slurried in distilled water and then another separation of the fish from the aqueous solution was effected by a pressing operation. The mercury content of the reprocessed fish was reduced from 0.65 ppm to 0.32 ppm on a dry weight basis.

EXAMPLE 7

A sample of dehydrated fish powder was made from a portion of a 152 lb. yellowfin tuna, which was caught near the Cocos Islands by precooking in water at 190° F. to 212° F. for two hours. The skin, bones, and blood meat were removed; and the excess liquid was drained off and removed by squeezing. The cooked loin was grated, dried at 100° F., and ground into a meal. This meal had the following analysis:

| | |
|---|---|
| Moisture | 5.0% |
| Crude protein | 92.61% |
| Mercury | 6.40 P.P.M. |

Ten gram samples were placed in bottles, 150 ml of water plus 10 ml of the following extracting agents were added; and the bottles capped, placed on a rotating machine and extracted for 24 hours at room temperature. The slurry was then removed and filtered through Whatman No. 1 filter paper, the material rinsed with water, drained and dried in a 100° C. oven for 16 hours. The fried filter cakes were then analyzed for mercury retention.

| Reagent | pH of Mixture | Mercury Content Dry Fish Cake | % Reduction |
|---|---|---|---|
| Control ($H_2O$) | 5.65 | 6.60PPM | 0 |
| .125% Sodium Thiosulfate | 6.80 | 5.83PPM | 11.6% |
| .125% Cysteine HCl | 5.35 | 4.53PPM | 31.0% |
| .125% Sodium Sulfide | 7.00 | 5.91PPM | 10.0% |
| .125% Mercaptan Ethyl Amine HCL | 6.50 | 4.90PPM | 26.0% |
| .125% Mercaptan Acetic Acid | 5.10 | 4.66PPM | 29.0% |
| Saturated $H_2S$ | 6.10 | 2.07PPM | 68.6% |
| Saturated $H_2S$ plus 2% EDTA | 6.05 | 3.00PPM | 54.5% |

These results indicate that the two most active sulfur compounds for extraction of mercury from fish are hydrogen sulfide and cysteine. Although an aqueous solution of hydrogen sulfide was the most effective, it has disadvantages of toxicity. Cysteine HCl, a relatively non-toxic amino acid, would be, therefore, the most practical of this series for treating edible tuna fish.

EXAMPLE 8

10 gram samples of the especially prepared dehydrated meal made from a high mercury content yellowfin tuna as described in Example 7 were extracted for 24 hours at room temperature on a rotating machine with 160 ml of homo-cysteine thiolactone hydrochloride solutions having the following concentrations. The slurry was then removed and filtered through Whatman No. 1 filter paper, the material rinsed with water, drained and dried in 100° C. oven for 16 hours. The dried filter cakes and filtrates were then analyzed for mercury contents.

| Concentration of Homo-Cysteine Thiolactone HCl | pH of Mixture | Mercury Dry Weight Basis Content of Cake | % Reduction of Hg | Mercury Dry Weight Basis Content in Filtrate |
|---|---|---|---|---|
| 0% Control (160cc$H_2O$) | 6.20 | 6.22PPM | 0% | 0.12PPM |
| .0626% | 6.00 | 5.45PPM | 12% | 1.82PPM |
| .125% | 5.90 | 4.52PPM | 27% | 4.45PPM |
| .250% | 5.85 | 5.27PPM | 15% | 4.86PPM |
| .375% | 5.60 | 4.48PPM | 28% | 4.84PPM |
| .500% | 5.70 | 4.80PPM | 23% | 4.38PPM |

The results show that under these conditions, pure water does not extract any appreciable amount of mercury from dehydrated tuna muscle and that when a concentration of dl homo-cysteine thiolactone HCl reaches an optimum concentration in the extracting medium of about 0.20 percent the amount of extractable mercury is at a maximum. Further, increases in the homo-cysteine concentration does not extract more mercury.

EXAMPLE 9

Tuna was subjected to a precooking, slurried, homogenized and treated with sodium thiosulfate, in which the pH was adjusted by addition of various acids which extracted mercury from the slurry of cooked tuna as follows:

| Reagent | | | pH | % Mercury Reduction |
|---|---|---|---|---|
| 1% | Thiosulfate | + Citric Acid | 5.55 | 24% |
| 1% | " | + Hydrochloric Acid | 4.25 | 54.5% |
| 1% | " | + Sulfuric Acid | 4.25 | 55.0% |
| 1% | " | + Phosphoric Acid | 4.25 | 45.0% |
| 1% | " | + Citric Acid | 4.35 | 42.0% |
| 1% | " | + no Acid | 5.80 | 18.0% |

This experiment showed that the pH conditions were very important for the thiosulfate ion to remove mercury from fish muscle and that a pH of 4.25 was optimum. The particular acid used for adjusting pH apparently has no effect on mercury removal.

From the foregoing, it is now apparent that applicants have set forth a unique process of treating animal flesh and particularly tuna wherein there is a significant color improvement in the cooked product along with prevention of greening and partial mercury removal from the tuna may be achieved, meeting all the objects and advantages set forth herein and that obvious modifications may be made from the disclosure set forth for purposes of illustration without departing from the spirit of the invention.

We claim:

1. A method of treating tuna-type fish to reduce the mercury content thereof comprising forming a slurry of the tuna fish, supplying a predetermined quantity of material to the slurry sufficient to reduce the mercury content, the material having a free sulfhydryl group or yielding a sulfhydryl bond, heating the slurry at a temperature and for a time sufficient to coagulate the protein of the tuna fish and separating the tuna flesh from the slurry to obtain tuna flesh having a reduced mercury content.

2. The method according to claim 1 wherein the material is selected from the group consisting of cysteine, homo-cysteine, thiosulfate and mercaptans.

3. The method according to claim 2 wherein the quantity of material supplied to the slurry is less than 5% by weight of the fish.

4. The method according to claim 2 wherein the heating is to a temperature of 212° F. for a period of time of approximately 5 minutes to 180 minutes.

5. The method according to claim 3 wherein the pH of the slurry is controlled within the range of 4–6.

6. A method of treating tuna-type fish which has been cooked to reduce the mercury content thereof comprising forming a slurry of the cooked tuna fish, supplying a predetermined quantity of material to the slurry sufficient to reduce the mercury content, the material being selected from the group consisting of cysteine, homo-cysteine, thiosulfate and mercaptans, retaining the slurry for a period of time of at least 1 hour to permit the extraction of mercury from the tuna flesh and separating the tuna flesh from the slurry to obtain tuna flesh having a reduced mercury content.

7. The method according to claim 6 wherein the quantity of material supplied to the slurry is less than 5 percent by weight of the fish.

* * * * *